3,198,639
PROCESS FOR CANNING SPANISH GREEN OLIVES
John Robert Webster, Lindsay, Calif., assignor to Lindsay Ripe Olive Company, Lindsay, Calif., a corporation of California
Filed June 15, 1962, Ser. No. 202,830
4 Claims. (Cl. 99—186)

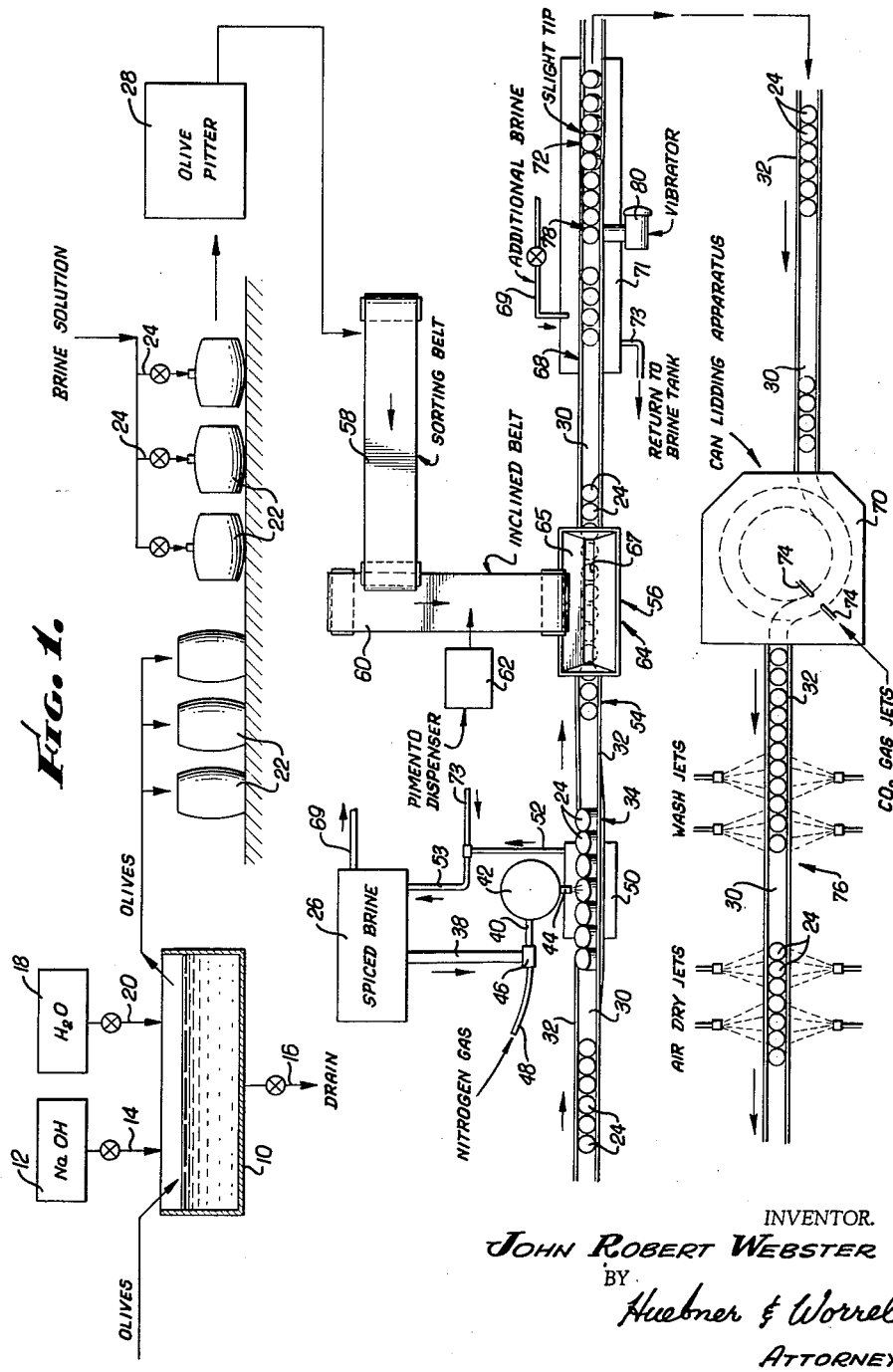

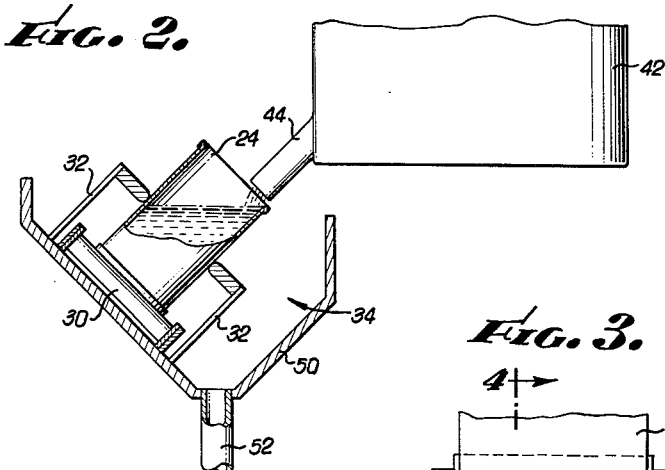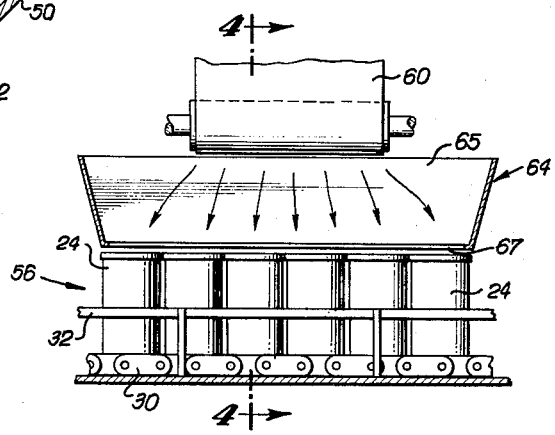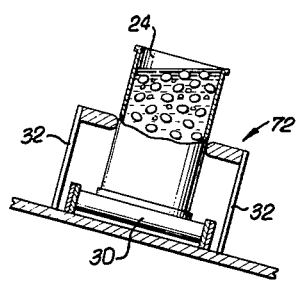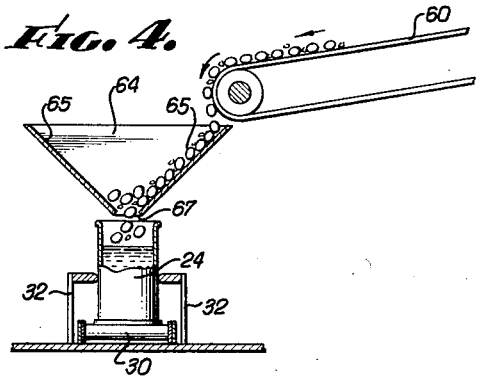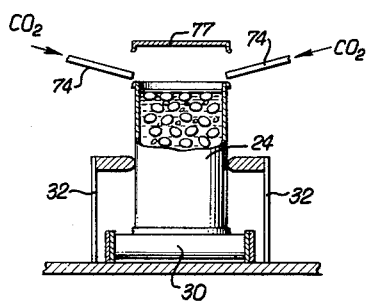

This invention relates to the preparation and canning of food products, and more particularly it relates to a process for preparing and canning Spanish green olives, in a flavoring solution so as to exclude oxygen which in combination with corrosive agents disposed in the olives and flavoring solution contributes to the corrosion of cans, and wherein the composition of the flavoring solution is such as to prevent the growth of yeast and mold following opening of the can and exposing the contents to the atmosphere.

The problem of corrosion is particularly difficult to cope with in the canning of a type of green olives, known in the trade as "Spanish Green Olives," because during the preparation of Spanish green olives for packaging, one or more corrosive agents, including lactic acid, are included in the olives and flavoring solution which corrosively attack the cans, and the activity or reaction of the agent or agents is increased by oxygen, a component of air, which is introduced into the cans. The corrosive activity also adversely affects the flavor of the canned Spanish green olives, and when the cans are opened and the contents exposed to the atmosphere, oxygen of the air encourages and sustains the growth of yeast and mold. Even when the olives and flavoring solution for the olives are bottled, yeast and mold is produced when the contents are exposed to air. Since the corrosive agent or agents contribute materially to the flavor of the olives, removing the agent or agents or avoiding its production is impractical. However, the corrosive activity of the agent or agents can be reduced considerably by removing air entrapped within the cans, or by avoiding introducing air into the cans.

Customarily, olives are introduced into the container first and then the flavoring solution is added, the result being that pockets of air between the olives are trapped by the incoming flavoring solution. The solution itself has a quantity of air dissolved or contained therein, and the method of introducing the flavoring solution into the container is generally such that splashing occurs with the attendant creation of air bubbles which become entrapped within the container. Pitted olives have air trapped within the pit holes, and the air therein being generally static, is introduced into the container.

Accordingly, it is a general object of the present invention to provide a process for preparing and canning Spanish green olives wherein the inherent corrosive properties of this type of olives and the flavoring solution within which they are contained are controlled so as to provide an extended shelf life for the canned olives.

Thus, it is an object of this invention to provide a process for preparing and canning Spanish green olives wherein the flavoring solution and olives are treated and manipulated in such a way as to avoid introducing damaging quantities of air into the can.

Another object of this invention is to provide a process of the aforementioned character wherein the flavoring solution is gently flowed into the can in such a manner as to avoid the formation of air bubbles.

A yet further object of this invention is to provide a process of the aforementioned character wherein the olives are introduced into the can after the introduction therein of the flavoring solution so as to avoid the formation of pockets of air between the olives.

A more specific object of this invention is to provide a process of the character described wherein pitted olives are agitated in such a manner as to effect displacing the air therein with flavoring solution when the olives are introduced into the can.

A still further object of this invention is to provide a process of the character described wherein the flavoring solution, having a quantity of air dissolved therein, is sparged with a relatively inert gas so as to dilute and greatly reduce the oxygen content of the flavoring solution.

A still more specific object of this invention is to provide a process of the aforementioned character wherein air occupying a headspace within the can is displaced by a non-corrosive gas which is soluble in the flavoring solution so that a vacuum develops in the can after the lid has been applied thereto.

These and other objects and advantages of the invention wil become apparent from a consideration of the description which follows, taken in conjunction with the drawings.

In the drawings:

FIG. 1 is a flow diagram, partially in elevation and partially in plan, illustrating a process for preparing and canning Spanish green olives.

FIG. 2 is a sectional view illustrating a stage in the process wherein cans are tipped at a relatively acute angle so a flavoring brine solution may be flowed and measured therein.

FIG. 3 is a sectional view illustrating another stage in the process wherein the cans are arranged under a hopper for receiving olives.

FIG. 4 is a sectional view taken on line 4—4 of FIG. 3, and illustrating the manner of tumbling and rolling the olives down one inclined side of the hopper and into cans.

FIG. 5 is a sectional view of still another stage of the process wherein the cans are tipped a slight amount so as to pour a predetermined amount of flavoring brine solution out of the cans.

FIG. 6 is a sectional view of another stage of the process wherein a non-corrosive gas is introduced into a head space in the cans immediately prior to applying lids to the cans.

Although the process, to be hereinafter described in detail, is primarily for the purpose of preparing and canning Spanish green olives, hereinafter identified simply as "olives," it also is entirely applicable for preparing and canning substantially all varieties of green olives.

Spanish green olives are characterized by a lactic acid fermentation process and the resultant flavor imparted thereto, and it is to be understood that Spanish green olives can be pitted or unpitted, although the present process is primarily concerned with pitted olives. The present process is considered to be a "cold pack process," i.e., no heat, other than room temperature, is employed except that during the fermentation phase, to be hereinafter considered in greater detail, heat may be optionally used to accelerate fermentation.

The selected olives before treatment have a waxy, relatively tough outer skin and a relatively bitter flavor. They also contain about 5% by weight of sugar. To reduce the bitter flavor, the olives are placed in a vat 10, containing a relatively mild base solution and soaked for approximately 24 hours. The supply of base solution which is preferably about 2% sodium hydroxide, is stored in a tank 12, and delivered to vat 10 via valve controlled line 14. Following the soaking period, the base solution is drained from vat 10 through valve-controlled drain 16 and for about the next 48 hours or a two-day period, the olives are subjected to several water baths. The water is disposed in storage tank 18 and when needed is delivered to vat 10 through valve-controlled line 20. It is preferred that the water be changed in vat 10 about every 6–12 hours in the aforementioned period. These baths have the effect of leaching a portion of the olive sugars so that as the water bath is drained from vat 10 through valve-controlled drain 16, a portion of the olive sugars are carried away. However, the sugars are replaced in a subsequent stage of olive treatment which will hereinafter be considered in more detail.

After the final water bath, the olives are transferred to upright wooden barrels 22, and then each barrel is sealed and turned on its side. Through the barrel bung hole a brine solution is added, through a valve-controlled line 24, which completely fills the barrel and displaces the air present to produce an anaerobic atmosphere, and after each barrel is filled the bung stopper is loosely inserted in the bung hole. About 15% by weight of the total brine solution is sodium chloride, the other component, of course, being water.

The olives, immersed in the brine, are placed in storage between six and seven months and allowed to cure, or age, and during this curing period a lactic acid fermentation reaction occurs. To insure maintaining a complete absence of air in the barrels during this curing period the bung stopper in each barrel is removed about twice a week and the contents are topped off with the aforementioned brine solution. About once a month during this aging period, about one pound of sugar is added to the contents in order to replace the aforesaid lost or leached olive sugars.

The presence of air in the barrels during this aging or curing period would encourage and sustain the growth of yeast, molds and bacteria other than the desired lactic acid bacteria, which would have an adverse effect on the olive flavor and would result in off fermentation but would inhibit the desired lactic acid fermentation reaction. The solution of strong salt brine and no air provides a selective environment wherein lactic acid bacteria are about the only bacteria which grow.

While the olives are curing in the barrels, the salt concentration drops to about 8% by weight of the total brine solution. This reduction in concentration is due to an osmosis-like process; i.e., the olives, through an osmosis-like process, take up approximately the aforementioned quantity of salt. However, to insure proper selective lactic acid fermentation and to provide an acceptable flavor to the olives, the salt concentration in the brine solution is required to be above about 5% by weight.

Lactic acid bacteria present in the barrels, in dust particles and in water of the brine, are responsible for the fermenting, and the added sugar also contributes to the fermentation reaction. The olives contain glucosides which are fermenting inhibitors and therefore are responsible for the extended 6–7 months' fermenting period. However, if considered desirable, fermentation can be accelerated by placing the barrels in a heated room, the temperature of the room determining the degree of acceleration of fermentation, but the temperature normally is not to exceed 85° F., otherwise the flavor of the olives will be adversely affected.

The lactic acid bacteria reacting in the selective environment of relatively strong brine and a substantially total absence of air produces lactic acid and traces of alcohol and esters and aldehydes which impart flavor to the olives.

Approximately a month before the olives are removed from barrels 22, a flavoring brine solution is prepared in a non-corrosive vat, preferably wooden for economic reasons, and approximately once a week the brine is stirred. The flavoring brine solution includes water, sodium chloride, vinegar, garlic, thyme, dill seed and red Jap peppers. However, the spice ingredients may be varied to vary the flavor if considered desirable. Also, included in the flavoring brine solution is sodium benzoate which is an anti-corrosive agent which tends to neutralize the corrosive effects of lactic acid and salt brine. Also, sodium benzoate prevents the growth of yeast and mold when cans 24 are opened to expose the contents to the atmosphere.

The foregoing procedure for curing the olives and preparing the flavoring brine solution is relatively well known, but it is believed essential to include it here so as to provide an understanding of the novel canning process which follows.

The flavoring brine is transferred from the barrels and poured through a filter into a vat or tank 26, and the olives are transferred from barrels 22 to a pitting machine 28 where they are pitted.

Empty cans 24 are fed in an upright position in a uniformly spaced relationship to a conveyor or canners chain 30. To prevent the cans from being dislodged during their progress along the canners chain, a pair of rails 32 are provided which are in contacting relationship with cans 24.

The cans 24 are standard commercially available containers which during their fabrication have a coat of epon urea formaldehyde rolled on the flat sheet metal before it is formed; a vinyl coat sprayed over to the inside seam of the can after it is crimped and soldered, and then a final spray coat of vinyl applied over the entire interior of the can. Before the ends of the can are stamped out of flat sheet stock, the sheet is roll-coated first with an oleo resinous prime coat and then with a vinyl coat.

As cans 24 are conveyed along canners chain 30, they are tipped to an angle of approximately 45° in zone 34, see FIG. 2. Tipping of the cans achieves two results: (1) an inclined surface is provided down which flavoring brine flows, and (2) the quantity of brine flowed into the cans is relatively accurately measured. The quantity of flavoring brine flowed into the cans is such that the olives will not float when they are delivered to the cans, and then air is not permitted to enter the pit holes of the olives after they are deposited in the cans. By flowing the flavoring brine down an inclined surface, splashing of the brine with its attendant entrapment of air is avoided. If the brine is poured, as distinguished from flowing, air bubbles are created which become trapped within the brine, and it is the oxygen of the air which contributes to and accelerates the reaction of the lactic acid and other corrosive agents to corrosively attack the cans and adversely affect the flavor of the olives.

The flavoring brine in vat 26 flows via lines 38 and 40 to an open-topped container 42 which has a delivery tube 44 thereon through which the flavoring brine flows into cans 24.

As optional equipment, a nozzle 46 may be installed at the juncture between lines 38 and 40. The flavoring brine will then enter nozzle 46 where it will be sparged with nitrogen which is delivered to the nozzle via a line or tube 48. The flavoring brine normally has between about 6–10 parts per million of oxygen dissolved therein which is reduced to between about 2–4 parts per million when sparged with nitrogen. Therefore, sparging the flavoring brine with nitrogen materially dilutes or reduces the concentration of oxygen, the oxygen escaping into the atmosphere from the open-topped container 42.

Delivery tube 44, and lines 38 and 40 may be without control valves, so the flow of flavoring brine from tube 44 is continuous. By this method the quantity of flavoring brine delivered to cans 24 is determined not by weighing but by the speed of conveyance of the cans along the canners chain 30, and by the quantity of flow of the flavoring brine from delivery tube 44.

Since the cans 24 are tipped approximately 45° in zone 34, the flavoring brine will overflow when the cans are about one-half full. The overflow is caught in a catch basin 50 and returned to vat 26 via lines 52 and 53.

As the cans leave zone 34, they enter zone 54 where they are returned to the upright position so that they will be in proper position to receive the olives and diced pimentos in zone 56, see FIGS. 3 and 4.

After the olives are pitted, they are deposited on a sorting conveyor belt 58 where unwanted material is removed, and from conveyor belt 58 the pitted olives transfer to a conveyor belt 60 which is at substantially a right angle to conveyor belt 58. This arrangement of the conveyor belts has the effect of equally distributing the olives on conveyor belt 60 when they transfer from conveyor belt 58. As the olives progress toward the terminal end of conveyor belt 60, a measured quantity of diced pimentos is intermixed therewith. Delivery of the pimentos to conveyor belt 60 is via a measuring dispenser 62.

At the terminal end of conveyor belt 60 is a hopper 64 having inclined sides 65, and as the olives leave the conveyor they are tumbled into the hopper so as to roll and tumble down one of the inclined sides of the hopper, and from the hopper they are tumbled into the cans 24. Static air is disposed in the pit holes and punch holes of the olives, and the aforementioned tumbling of the olives has the effect of agitating and causing the air to circulate so that when the olives enter cans 24 the flavoring brine solution therein will displace the air in the pit holes and punch holes.

Hopper 64 has an elongated delivery mouth 67 which provides for the substantially simultaneous depositing of olives in about 6 cans.

The quantity of olives and diced pimentos delivered to cans 24 is determined by the speed of delivery of the product from hopper 64 and the speed of travel of the cans along the canners chain. Also the quantity of olives and diced pimentos deposited in cans 24 is such that the flavoring brine solution will substantially entirely cover the product, but the quantity of brine solution will not be such as to float the olives and pimentos.

From zone 56 the partially filled cans are conveyed to zone 68, and in this zone the cans 24 progress under a delivery tube 69 from which flavoring brine solution continuously flows to top-off or fill the cans and displace any air that may be present adjacent the top of the cans. Delivery of flavoring brine solution to delivery tube 69 is from vat 26. Overflowing flavoring brine solution is caught in a catch basin 71 and returned to vat 26 via line 73 which forms a juncture with lines 52 and 53.

The topped-off cans may be conveyed directly to a lidding machine 70 which applies the lids to the full cans 24. However, if the cans are filled to the top with the flavoring brine solution, the solution is likely to spray from the cans when they are subsequently opened.

Therefore, to prevent spraying of the flavoring brine solution from cans 24, the cans are conveyed from zone 66 to zone 72 where again the cans are tilted, see FIG. 5. The angle of tilt is such as to provide about ¼" head space between the surface of the flavoring brine solution and the upper rim of the can when the cans are returned to an upright position. The spilled flavoring brine solution is retrieved in the aforementioned catch basin 71 and returned to vat 26 via line 73. In this condition, cans 24 are conveyed to the lidding machine 70.

The lidding machine is provided with a plurality of jets 74 from which is delivered carbon dioxide gas, see FIG. 6. Immediately prior to a lid 77 being applied to each can 24, carbon dioxide gas is flowed into the aforesaid head space to substantially entirely displace the air therein.

The carbon dioxide gas is soluble in the flavoring brine solution, and therefore a vacuum is established in the cans after the lids are applied. The carbon dioxide gas occurs during the aforementioned fermentation reaction and therefore, may be considered a naturally occurring gas which will not have an adverse affect on the flavor of the olives. The carbon dioxide gas will not materially contribute to corrosion in the cans.

After the cans 24 leave lidding machine 70, they are conveyed to zone 76 where they are washed and dried. However, it has been found that if the temperature of the flavoring brine solution falls much below about 70° F., which is generally room temperature, it becomes difficult to dry the cans after washing. If cans 24 are not dry, rust forms, and labels are difficult to apply. Therefore, the temperature of the flavoring brine solution is preferably kept about 70° F.

To insure complete release of air contained in the flavoring brine solution, the cans 24 may be vibrated in a zone 78 which is located between zones 68 and 72. The vibrator 80, considered optional equipment, may be connected to one or both of rails 32, and the rails may be caused to gently vibrate cans 24 as they progress through zone 78.

An approximate tabulation of can contents is as follows:

| | Percent by weight |
|---|---|
| Pitted olives (about .3% of which is lactic acid) | 45.000 |
| Water | 45.415 |
| Salt (sodium chloride) | 5.000 |
| Pimentos | 3.000 |
| Vinegar (about 10% of which is acetic acid and about 90% of which is water) | 1.500 |
| Sodium benzoate | 0.075 |
| Flavoring spices: garlic, thyme, dill seed, red Jap peppers | .010 |

It is to be understood that the quantities given may be varied for the purpose of altering the flavor or for some other specific purpose, and therefore the tabulated quantities are not to be considered a limitation.

While the instant invention has been shown and described herein in what is conceived to be the most practical and preferred embodiment, it is recognized that departures may be made therefrom within the scope of the invention; which is therefore, not to be limited to the details disclosed herein, but is to be accorded the full scope of the claims so as to embrace any and all equivalent methods.

What is claimed is:

1. In a process for canning Spanish green olives having corrosive agents therein, in metal cans, and wherein said olives are submerged in a brine with an inert atmosphere thereover in said can, the improvement comprising the steps of; first gently depositing a predetermined quantity of brine in a can, without splashing, to minimize entrapment of air therein; thereafter tumbling said olives into said brine in said can, in spaced relation, to minimize the carrying of air into said brine; then closing said can while providing said inert atmosphere therein.

2. The process defined in claim 1 wherein said step of depositing brine in said can is performed by tilting said can and flowing a stream of said brine thereinto along the inclined sidewall thereof.

3. The process defined in claim 2 wherein said can is filled to overflowing with said brine while said can is tilted, then returning said can to erect position whereby the level of brine therein is below the top thereof.

4. The process defined in claim 1 wherein said inert atmosphere is provided over the brine in said can by directing a stream of gas soluble in said brine into the upper portion of said can while applying a lid thereto.

References Cited by the Examiner

UNITED STATES PATENTS 1,649,127  11/27  Rector _____ 99—182
1,852,941  4/32   Stewart _____ 99—186 X

OTHER REFERENCES

Circular 276, University of California, College of Agriculture, Agricultural Experiment Station, Berkeley, Calif., dated March 1924, revised August 1942, booklet entitled, "Home Canning," pages 30–32.

A. LOUIS MONACELL, *Primary Examiner.*

ABRAHAM H. WINKELSTEIN, *Examiner.*